United States Patent [19]
Monson et al.

[11] Patent Number: 5,267,708
[45] Date of Patent: Dec. 7, 1993

[54] HEAD SUPPORT APPARATUS

[75] Inventors: Conrad B. Monson, Yorba Linda; Emily L. Howard, San Pedro; Steven L. Hecq, Norwalk; Curtis E. Thompson, Laguna Hills; William J. Adams, Torrance, all of Calif.

[73] Assignee: Rockwell International Corp., Seal Beach, Calif.

[21] Appl. No.: 951,960

[22] Filed: Sep. 28, 1992

[51] Int. Cl.$^5$ .............................................. B64D 11/06
[52] U.S. Cl. ............................ 244/122 AG; 244/121; 280/748
[58] Field of Search ............ 244/122 AG, 122 B, 121, 244/118.5; 280/748, 801; 297/394, 395, 397, 464

[56] References Cited
U.S. PATENT DOCUMENTS

| | | | |
|---|---|---|---|
| 4,477,041 | 10/1984 | Danne | 244/122 AG |
| 4,638,510 | 1/1987 | Hubbard | 244/122 AG X |
| 4,664,341 | 5/1987 | Cummings | 244/122 AG |
| 4,923,147 | 8/1990 | Adams et al. | 244/122 |
| 4,925,133 | 5/1990 | Wurst et al. | 244/118 |
| 4,967,985 | 11/1990 | Deakin | 244/122 AG |

Primary Examiner—Joseph F. Peters, Jr.
Assistant Examiner—Christopher P. Ellis
Attorney, Agent, or Firm—Lawrence N. Ginsberg; Charles T. Silberberg

[57] ABSTRACT

A head support apparatus for protecting the head of a subject positioned in a vehicle against the detrimental effects of acceleration. Generally, the invention comprises a beam housing attachable to a support device for supporting a subject's upper body while positioned in the vehicle. The beam housing has a side opening on each side thereof and a channel formed in the interior of the housing, extending from one side opening to the opposite side opening. Beam housing support is provided for rigidly supporting the beam housing to the support device within a y-z plane defined by the intersection of a y-axis and a z-axis, but allowing rotation about an x-axis. The x, y and z axes define an orthogonal coordinate system wherein the x-axis extends through the subject's face to the back of the head, the y-axis extends laterally from ear-to-ear, and the z-axis extends vertically from the top of the head through the subject's chin. A substantially U-shaped rigid beam having a non-circular cross section is mountable through side openings and within the channel. Bearings are secured to the housing along the channel for rigidly supporting the beam within the x-y plane but allowing rotation of the beam about the x-axis within the channel. Helmet attachments are provided for rigidly supporting the subject's helmet relative to the rigid beam within the x-z plane but allowing rotation of the helmet about the y-axis.

10 Claims, 4 Drawing Sheets

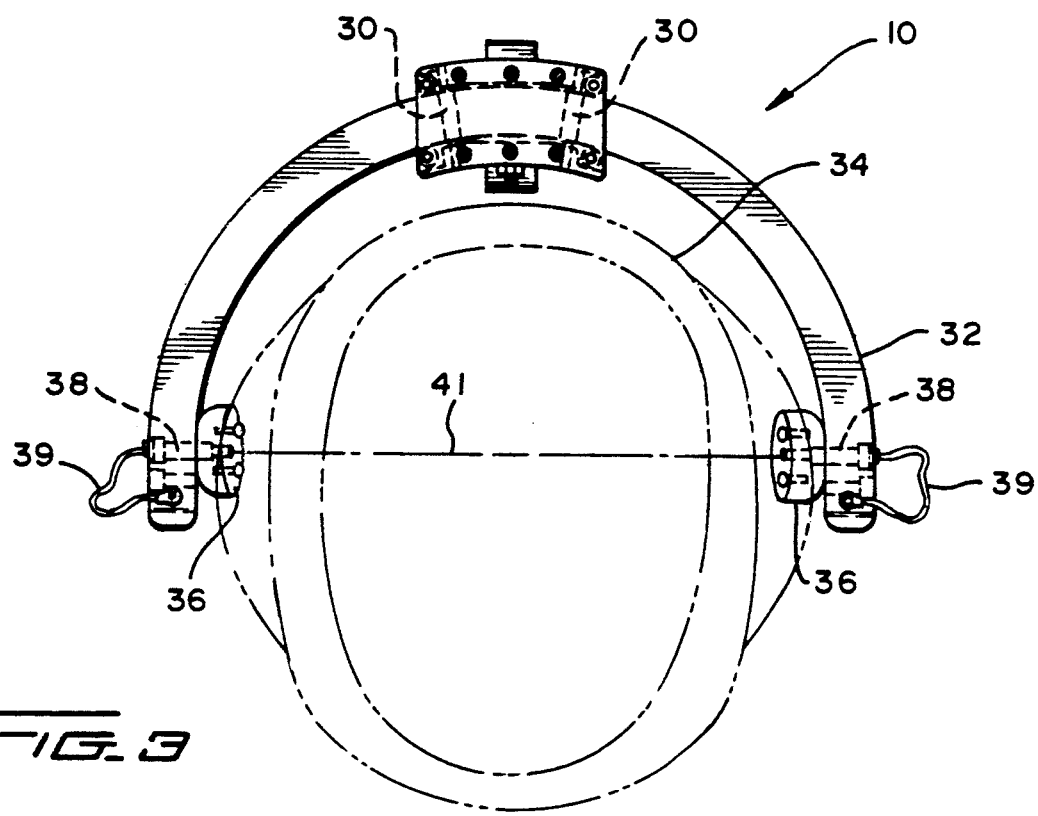
FIG_3
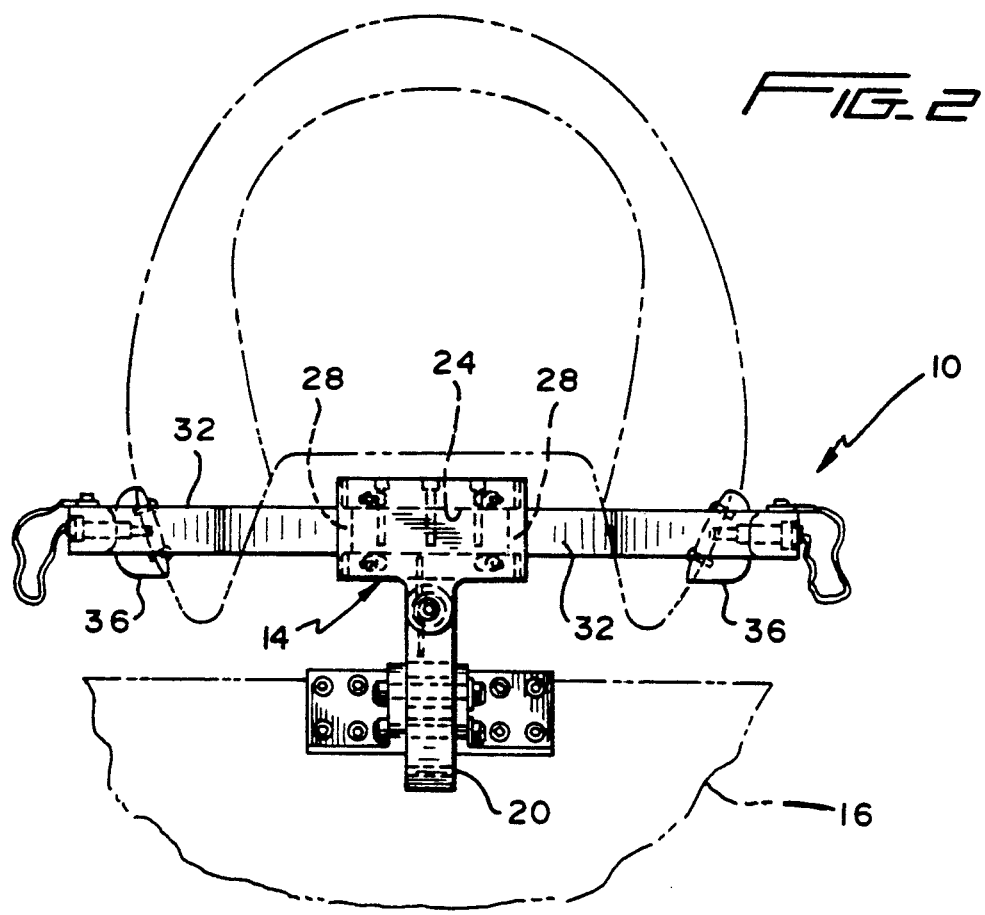
FIG_2

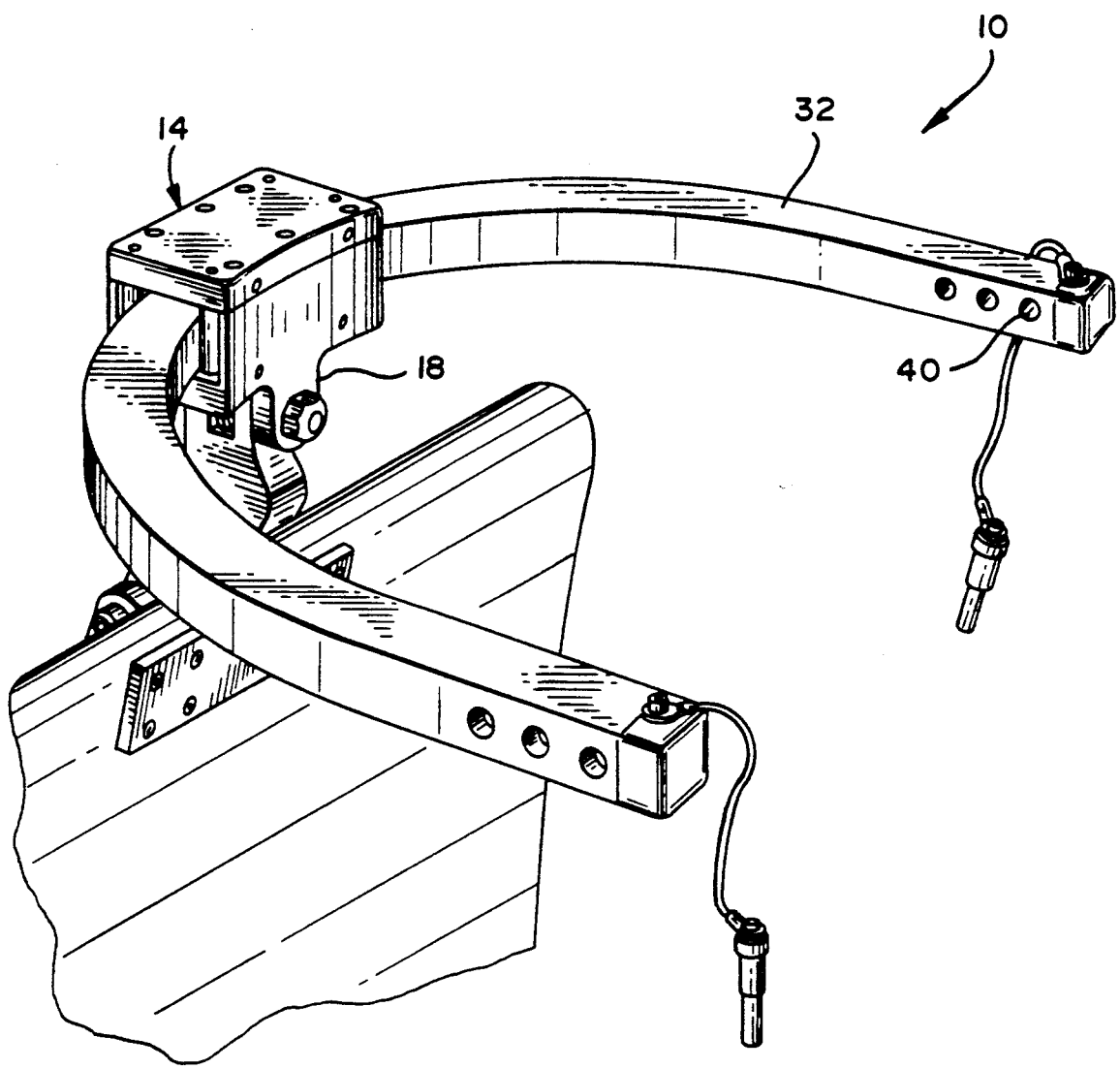
FIG_4

HEAD SUPPORT APPARATUS

BACKGROUND OF THE INVENTION

1. Field of the Invention

This invention relates to body support systems, and particularly to those systems designed to support the head and neck during acceleration exposure.

2. Description of the Related Art

During high speed turns and other maneuvers, pilots of modern, high performance aircraft are exposed to high levels of +Gz (head-to-foot) acceleration. While exposed to this "Gz-loading," pilots are unable to voluntarily move their heads. Furthermore, if their heads do not rest against the ejection seat, they are also unable to maintain an upright head position with their eyes also upright and looking forward. The G-force "pushes" their heads towards the cockpit floor resulting in decreased situational awareness, head pain, neck pain and discomfort. Head and neck pain (or even death) from G loading on the unsupported head can also occur during aircraft ejections.

The potential for head and neck injury limits the levels of pilot acceleration exposure. A device to provide head support during acceleration would not only protect pilots but also increase the G levels that can be safely tolerated.

In addition to the need for a head support device during acceleration, there is also a need for head support while wearing a Helmet Mounted Display (HMD). HMDs are being incorporated into a number of current and future aircraft. Because they are mounted on the helmet, HMDs increase the weight of the helmet and thus the weight that head and neck muscles must support. A device to unload the weight of the helmet and HMD from the head and neck muscles would be useful especially during G-loading. Such a support device should be designed so that it does not interfere with head movements or with the attachment of HMD components onto the helmet.

To effectively use an HMD, the head position must be tracked. Modern tracking devices are cumbersome and do not always provide an accurate indication of the position of the head. A device that provides accurate head tracking for all head movements and supports a helmet with an HMD would aid in the full implementation of HMD technology in the cockpit. Finally, head tracking is useful for a number of other applications such as aiming weapons and/or sensors, and conducting biomedical or human factors research.

Currently, there is no device that: 1) provides head support during acceleration and ejection while the subject wears a standard helmet, 2) provides head support during acceleration and ejection while wearing an HMD, and 3) provides an accurate measure of head position.

U.S. Pat. No. 4,923,147 entitled "Head Support/Spine Offloading Ejection Seat Insert" assigned to Rockwell International Corporation, and U.S. Pat. No. 4,664,341 entitled "Head Restraint System" also assigned to Rockwell International Corporation disclose devices for supporting the head during acceleration. Both devices include straps connecting the head support device to the seat or seat-mounted equipment. Because of the helmet-to-seat connection, these straps could get caught on cockpit components and thereby interfere with the normal ejection process. Such an interference would increase the risk of injury to an ejecting pilot.

The '147 patent discloses a head support component which must extend above the top of the helmet to unload the G-forces on the head. This configuration limits the amount of clearance between the head support/helmet combination and the interior of the aircraft canopy. Because of this clearance problem, relatively tall pilots may not be able to fly in cockpits that would be accessible to them if they were not wearing the head support device disclosed in the '147 patent. With the head restraint system disclosed in the '341 patent, downward G loads oriented through the top of the head are not countered by the restraint system and thus must be supported by the pilot's head and neck muscles. As a result, potential injuries due to G loading on the head, especially while the body is in a forward-leaning position, are not prevented.

OBJECTS AND SUMMARY OF THE INVENTION

It is a principal object of the present invention, therefore, to protect the occupant of a vehicle from the detrimental effects of G-loading experienced during high speed travel.

Another object of the present invention is to provide an accurate means of head tracking for precisely locating the head in three dimensions.

The present invention is a head support apparatus for protecting the head of a subject positioned in a vehicle against the detrimental effects of acceleration. Generally, the invention comprises a beam housing attachable to a support device for supporting a subject's upper body while positioned in the vehicle. The beam housing has a side opening on each side thereof and a channel formed in the interior of the housing, extending from one side opening to the opposite side opening. Beam housing support means is provided for rigidly supporting the beam housing to the support device within a y-z plane defined by the intersection of a y-axis and a z-axis, but allowing rotation about an x-axis. The x, y and z axes define an orthogonal coordinate system wherein the x-axis extends through the subject's face to the back of the head, the y-axis extends laterally from ear to ear, and the z-axis extends vertically from the top of the head through the subject's chin. A substantially U-shaped rigid beam having a non-circular cross section is mountable through side openings and within the channel. Bearing means are secured to the housing along the channel for rigidly supporting the beam within the x-y plane but allowing rotation of the beam about the x-axis within the channel. Helmet attachment means are provided for rigidly supporting the subject's helmet relative to the rigid beam within the x-z plane but allowing rotation of the helmet about the y-axis.

The head support apparatus of the present invention resolves the difficulties associated with prior art head support devices. The present invention supports the head during acceleration and ejection; provides head support for a full range of head movements including head movement during acceleration; it attaches to the helmet without interfering with the placement of HMDs; and it maintains the head in an eyes-forward and upright orientation for improved situational awareness during forward-leaning and upright acceleration. Furthermore, the head support apparatus may be utilized with a head tracking apparatus for accurate head tracking.

Additionally, because it does not have loose straps that could get caught on cockpit components, the apparatus of the present invention does not increase the risk of injury during ejection.

The present invention is portable and it maintains faster tracking capabilities and provides more accurate tracking and passive system operations than the prior art.

Other objects, advantages and novel features of the present invention will become apparent from the following Detailed Description of the invention when considered in conjunction with the accompanying drawings.

BRIEF DESCRIPTION OF THE DRAWINGS

FIG. 2 is a back view of the apparatus of FIG. 1.

FIG. 3 is a top view of the apparatus of FIG. 1.

FIG. 4 is a perspective view of the apparatus of the present invention without the helmet attached.

The same elements or parts throughout the figures are designated by the same reference characters.

DETAILED DESCRIPTION OF THE PREFERRED EMBODIMENT

Figure 1:
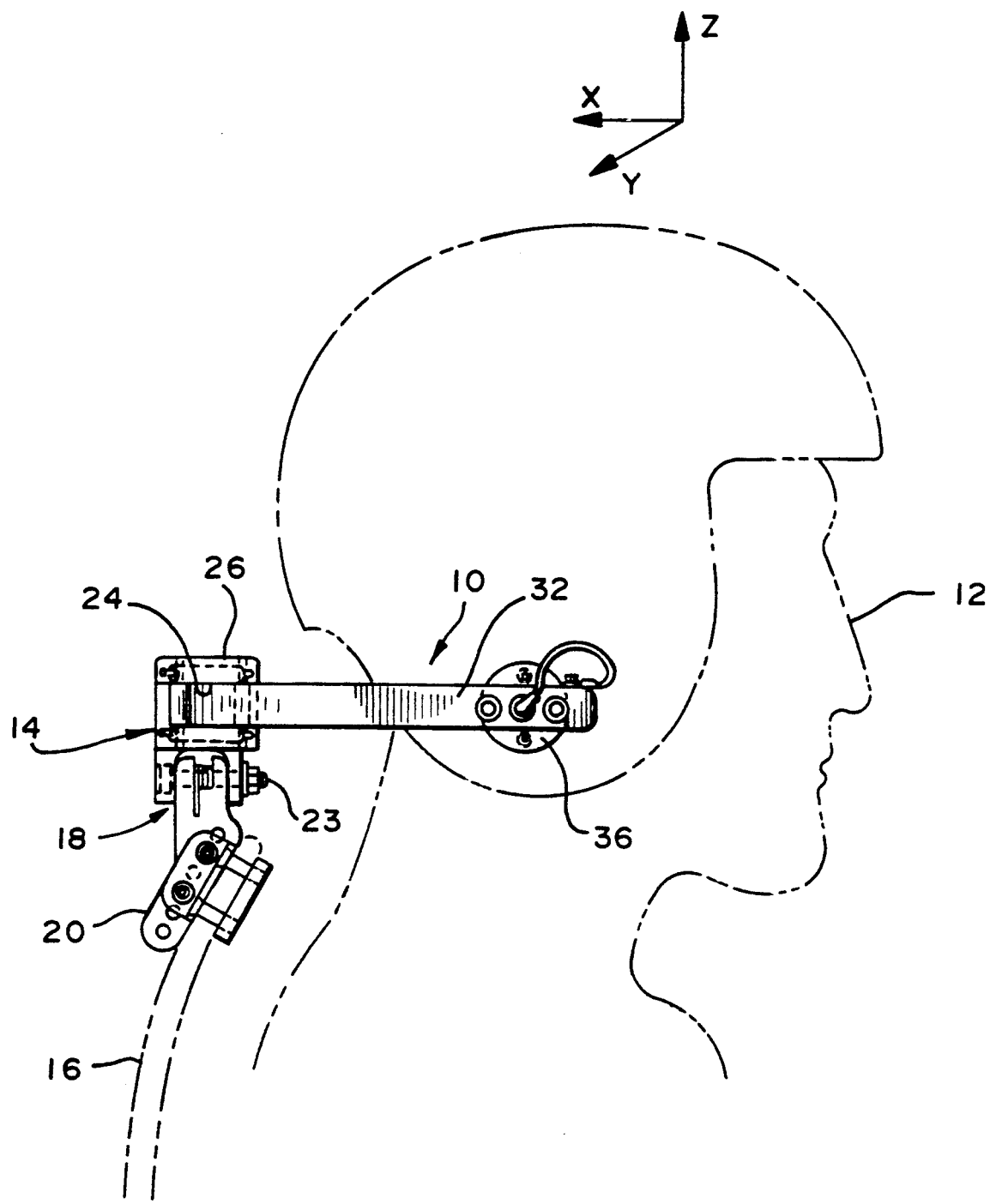
FIG. 1 illustrates a side view of the head support apparatus of the present invention attached to a helmet being worn by a subject and also attached to a body support device.

Referring to the drawings and the characters of reference marked thereon, FIG. 1 illustrates the present invention, designated generally as 10 being worn by a subject 12. A beam housing 14 is attached to a support device 16. The support device 16 may be of the type described and claimed in U.S. Pat. No. 4,923,147, entitled "Head Support/Spine Offloading Ejection Seat Insert", described in the Background of the Invention, above, and incorporated herein by reference. Other body support devices that function to support the upper body while positioned in the vehicle may be utilized. For example, U.S. Pat. No. 4,925,133 entitled "Hydraulic Force Buoyancy Suit" discloses buoyancy suit support means that can be used with the present invention. The '133 patent is incorporated herein by reference.

Furthermore, it is understood that the below-described application of this invention, as it relates to an aircraft application, is a particularly adaptable utilization of this invention. However, this use is described by way of illustration and not limitation. Other activities such as race-car driving subject the head to accelerative forces with potential for head and neck pain and injury. The present invention device could also protect the heads of race-car drivers and others engaged in activities that subject the head to accelerative forces.

The lower part of the beam housing 14 includes a beam housing support means, preferably a clevis and pin assembly 18. The clevis and pin assembly 18 has a lower end securely attached to an adjustable anchor bracket 20 which is secured to the body support device 16. The clevis and pin assembly 18 rigidly supports the beam housing 14 to the support device 16 within a y-z plane defined by the intersection of the y-axis and a z-axis. However, this assembly 18 allows rotation about the x-axis. The x, y, and z axes define an orthogonal coordinate system, designated 22. The x-axis extends through the subject's face to the back of the head. The y-axis extends laterally from ear-to-ear. The z-axis extends vertically from the subject's chin to the top of the head. A spring-loaded bolt 23 is inserted through a clevis fitting to secure the beam housing 14. Thus, the head may be moved from side-to-side, i.e. about the x-axis. The beam housing 14 has a rectangularly-shaped channel 24 formed in its interior extending from a side opening to an opposite side opening. Access to the interior of the housing 14 is preferably provided by a removable top plate 26 that is screwed onto the main part of the housing 14. Removal of the top plate 26 provides access to the interior of the beam housing 14, along the edges of the channel 24 in which vertically mounted bearings 28 and horizontally mounted bearings 30 are located, as seen in FIGS. 2 and 3.

A substantially U-shaped rigid beam 32, preferably having a non-circular cross section, is mounted through the side openings and within the channel 24. Rigid beam 32 has a non-circular cross section to allow the beam to maintain a secure relationship relative to the housing. Thus, beam 32 preferably has a square, rectangular or elliptical cross section. It may be formed by, for example, steel, aluminum or composite material. Thus, the bearings 28,30 rigidly support the beam 32 within the x-y plane but allow rotation of the beam 32 about the z-axis within the channel 24. This U-shaped beam 32 may be best seen in FIG. 4.

Referring again to FIG. 3, it can be seen that the ends of the rigid beam 32 may be attached to a helmet 34 by two attachment fittings 36, each attached to a respective side of the subject's helmet 34. Pin members 38 are inserted through openings 40 (see FIG. 4) in the rigid beam 32 and into a respective attachment fitting 36. Each attachment fitting 36 is preferably a resilient disk. Thus, the subject's helmet is rigidly supported relative to the rigid beam 32 within the x-z plane, but rotation of the helmet is allowed about the y-axis. (Each pin 38 is also attached to the beam 32 by means of an anchored cable 39 that prevents the pin 38 from being lost when it is not inserted through the beam 32 into the attachment fitting 36.)

Referring again to FIG. 3, it can be seen that the line 41 joining attachment fittings 36 allows head rotation near the point (not shown) where the spine attaches to the skull. The line joining these attachment fittings 36 is also near the head center of mass, thereby minimizing head loading and consequently the amount of force that must be generated by head and neck muscles to support the head. The reduced head loading results in a reduction in the risk of G-induced head injury or discomfort. The apparatus 10 of the present invention allows the head to be smoothly and easily rotated in all three axes and supported in an upright orientation (with the eyes also upright and looking forward) during Gz loading while the body is positioned upright or leaning forward.

In addition to providing head support and allowing head rotation, the apparatus 10 of the present invention can also provide an accurate method of tracking head movements. For helmet mounted displays (HMDs) to work efficiently, spatially dependent information must be projected with respect to the subject's head movements. To accomplish this HMD image/head movement coupling, a head tracking system is needed. Current devices use a magnetic sensing system or an infrared beam projected from a canopy-mounted source towards a target on the helmet. The use of a magnetic system or IR beam and target add complexity and weight to the cockpit components and do not always sense the head rotations quickly or precisely in three dimensions.

With the apparatus 10 disclosed herein, externally-mounted magnetic sensor or IR source and target systems can be eliminated and replaced with a tracking system that is integral with the head support apparatus 10.

Figure 5:
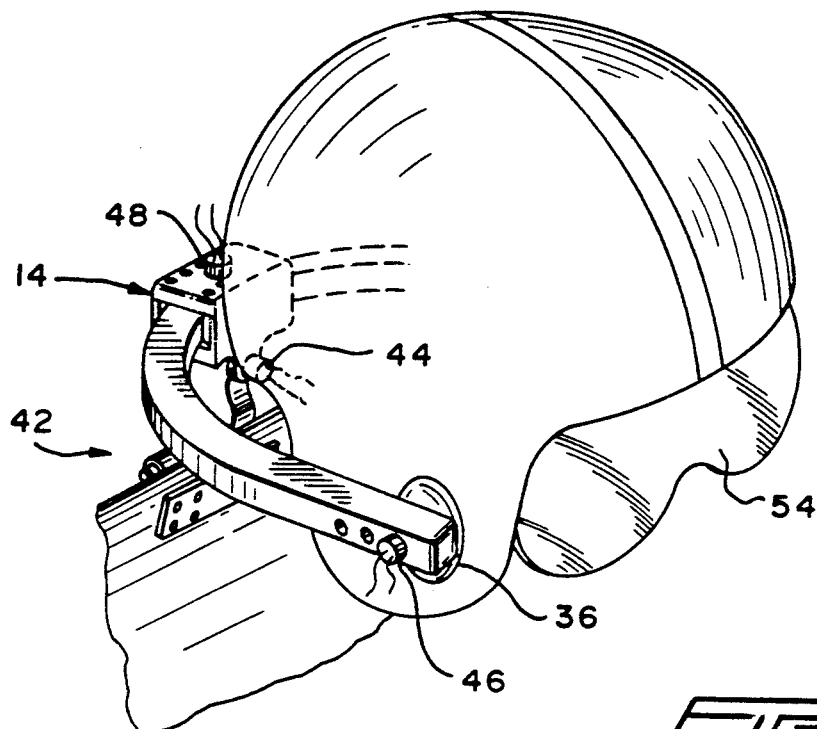
FIG. 5 illustrates utilization of the head support apparatus with a tracking apparatus.

Referring now to FIG. 5, a tracking apparatus is illustrated, designated generally as 42. Tracking apparatus 42 comprises an x-axis rotation sensor 44 associated with the beam housing support means 14 (specifically the clevis and pin assembly). Sensor 44 senses rotation of the subject's head about the x-axis. A y-axis rotation sensor 46 is associated with the helmet attachment means 36 for sensing rotation of the subject's head about the y-axis. A z-axis rotation sensor 48 is associated with the bearing means for sensing rotation of the subject's head about the z-axis.

The rotation sensors 44, 46, 48 may be mechanical, optical or inertial, or other conventional motion sensing devices.

Figure 6:
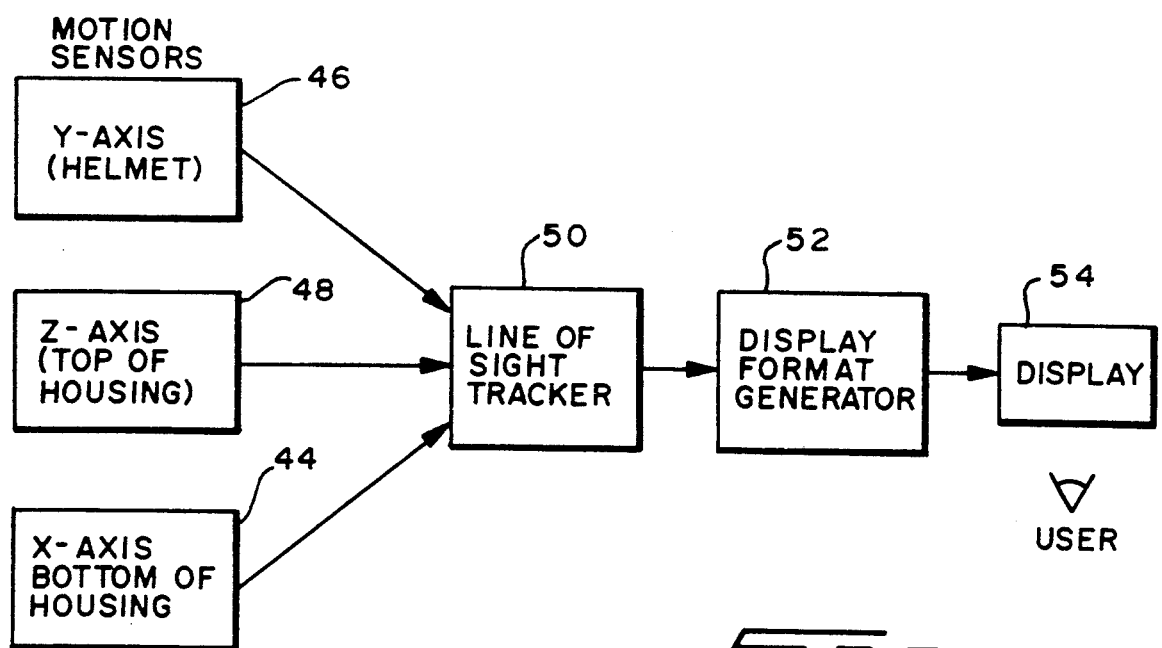
FIG. 6 is a flow block diagram illustrating implementation of the tracking apparatus.

Referring now to FIG. 6, it may be seen that the outputs for the motion sensors 44, 46, 48 are directed to processing means, preferably a line-of-sight tracker 50 and display format generator 52. The line-of-sight tracker 50 converts the motion sensing signals into electronic form where they are passed to a display format generator 52 which computes the HMD image. The purpose of these computations is to create an image in the subject's display or visor 54. The resulting image is intended to display spatially dependent information that is updated as a function of the subject's head position.

Since the apparatus 42 supports the head in each axis, the rotations of the head in three dimensions can be precisely determined so that information presented on an HMD can be accurately tied to head position.

Obviously, many modifications and variations of the present invention are possible in light of the above teachings. It is, therefore, to be understood that within the scope of the appended claims the invention may be practiced otherwise than as specifically described.

What is claimed and desired to be secured by Letters Patent of the United States is:

1. A head support apparatus for protecting the head of a subject positioned in a vehicle against the detrimental effects of acceleration, comprising:
   (a) a beam housing attachable to a support device for supporting a subject's upper body while positioned in said vehicle, said beam housing having a side opening on each side thereof and a channel formed in the interior of said housing extending from one side opening to the opposite side opening, said beam housing including,
      beam housing support means for rigidly supporting said beam housing to said support device within a y-z plane defined by the intersection of a y-axis and a z-axis, but allowing rotation about an x-axis, said x, y, and z axes defining an orthogonal coordinate system, said x-axis extending through the subject's face to the back of the head, said y-axis extending laterally from ear to ear, and said z-axis extending vertically from the top of the subject's head through the chin;
   (b) a substantially U-shaped rigid beam mountable through said side openings and within said channel;
   (c) bearing means secured to said housing along said channel for rigidly supporting said beam within the x-y plane but allowing rotation of said beam about said z-axis within said channel; and
   (d) helmet attachment means for rigidly supporting the subject' helmet relative to said rigid beam within the x-z plane but allowing rotation of said helmet about said y-axis.

2. The apparatus of claim 1 wherein said helmet attachment means comprises:
   two attachment fittings, each attached to a respective side of the subject's helmet; and
   two pin members, each pin member insertable through an opening in a respective end of the rigid beam and into one of said respective attachment fittings.

3. The apparatus of claim 2 wherein each said attachment fitting comprises a resilient disc element.

4. The apparatus of claim 1 wherein said beam housing support means comprises a clevis and pin assembly.

5. The apparatus of claim 1 further comprising a tracking apparatus, said tracking apparatus comprising:
   rotation sensing means for sensing head rotation about at least one of said axes.

6. The head support apparatus of claim 1 further comprising a tracking apparatus, comprising:
   a) an x-axis rotation sensor associated with said beam housing support means for sensing rotation of the subject's head about the x-axis;
   b) a y-axis rotation sensor associated with said helmet attachment means for sensing rotation of the subject's head about the y-axis; and
   a z-axis rotation sensor associated with said bearing means for sensing rotation of the subject's head about the z-axis.

7. The head support apparatus of claim 6, further including processing means for receiving output signals from said rotation sensors, the output from said processing means being used as input to an information representation device.

8. The head support apparatus of claim 7, wherein said information representation device comprises a helmet mounted display device.

9. The head support apparatus of claim 1, wherein said U-shaped rigid beam has a non-circular cross section.

10. A head support apparatus for protecting the head of a subject positioned in an aircraft against the detrimental effects of acceleration, comprising:
   (a) a beam housing attachable to a support device for supporting a subject's upper body while positioned in said aircraft, said beam housing having a side opening on each side thereof and a channel formed in the interior of said housing extending from one side opening to the opposite side opening, said beam housing including,
      beam housing support means for rigidly supporting said beam housing to said support device within a y-z plane defined by the intersection of a y-axis and a z-axis, but allowing rotation about an x-axis, said x, y, and z axes defining an orthogonal coordinate system, said x-axis extending through the subject's face to the back of the head; said y-axis extending laterally from ear to ear, and said z-axis extending vertically from the top of the subject's head through the chin;
   (b) a substantially U-shaped rigid beam mountable through said side openings and within said channel;
   (c) bearing means secured to said housing along said channel for rigidly supporting said beam within the x-y plane but allowing rotation of said beam about said z-axis within said channel; and
   (d) helmet attachment means for rigidly supporting the subject's helmet relative to said rigid beam within the x-z plane but allowing rotation of said helmet about said y-axis.

* * * * *